United States Patent [19]
Kurotaka

[11] Patent Number: 6,078,766
[45] Date of Patent: Jun. 20, 2000

[54] BELT CONVEYING APPARATUS HAVING A SELF-ADJUSTMENT MECHANISM FOR BELT DISTORTION AND METHOD THEREFOR

[75] Inventor: Shigeo Kurotaka, Sagamihara, Japan

[73] Assignee: Ricoh Company, Ltd., Tokyo, Japan

[21] Appl. No.: 09/172,907

[22] Filed: Oct. 15, 1998

[30] Foreign Application Priority Data

Oct. 15, 1997 [JP] Japan ..................................... 9-281865

[51] Int. Cl.⁷ .................................................. G03G 15/00
[52] U.S. Cl. .......................... 399/165; 399/303; 399/313; 399/329; 198/806
[58] Field of Search ............................ 198/806; 347/153, 347/154; 399/165, 303, 313, 329

[56] References Cited

U.S. PATENT DOCUMENTS

| | | | |
|---|---|---|---|
| 2,451,394 | 10/1948 | Klein | 198/806 |
| 3,993,186 | 11/1976 | Sokolowski | 198/806 |
| 4,286,706 | 9/1981 | Castelli et al. | 198/806 |
| 4,332,458 | 6/1982 | Hoffman | 198/806 |
| 5,592,275 | 1/1997 | Echigo et al. | |
| 5,678,161 | 10/1997 | Kurotaka et al. | |

*Primary Examiner*—Jospeh E. Valenza
*Attorney, Agent, or Firm*—Oblon, Spivak, McClelland, Maier & Neustadt, P.C.

[57] ABSTRACT

A belt driving apparatus includes an endless belt which is wrapped around at least a driving roller and a driven roller, a belt shift detecting member detecting a shift of the endless belt and being rotatably supported by the driven roller with at least one end of a shaft thereof, the belt shift detecting member rotating free from a rotation of the driven roller, a supporting device supporting the at least one end of shaft of driven roller and being moveable in a direction perpendicular to a direction of the shaft of the driven roller, and a conversion device converting a displacement of said at least one end of the shaft of the driven roller into a displacement in a predetermined direction perpendicular to shaft of the driven roller, when the endless belt is brought into contact with the belt shift detecting member and belt shift detecting member has a rotation torque. The conversion device includes a secured member which is mounted on a main body side of the apparatus, arranged to contact a part of the belt shift detecting member when the belt shift detecting member rotates to a predetermined angle caused by the rotation torque, and a cam converting a movement of the belt shift detecting member from rotation movement by the predetermined angle into a linear movement.

21 Claims, 19 Drawing Sheets

BELT CONVEYING APPARATUS HAVING A SELF-ADJUSTMENT MECHANISM FOR BELT DISTORTION AND METHOD THEREFOR

BACKGROUND OF THE INVENTION

1. Field of the Invention

The present invention relates to a belt conveying apparatus which uses an endless belt and is capable of adjusting a distortion of the belt with a simple mechanism.

2. Discussion of the Background

Conveying materials from one place to another using a belt is a popular technique that is widely used, for example, in image forming operations of an image forming apparatus, such as copying machines, printers, and so forth. More specifically, the technique is applied to, but not limited to, a transfer-sheet conveyer which conveys a transfer-sheet in the image forming operation of the image forming apparatus. Such a material conveying apparatus using an endless belt (hereinafter referred to as a belt driving apparatus) has drawbacks inherent to a rotating belt.

One problem associated with the rotating motion of the belt is that when the belt is required to regularly rotate along a predetermined line, the belt tends to shift laterally during a rotation. As a result, a transfer-sheet is conveyed to a displaced position.

Various methods for preventing the displacement of a belt have been proposed for belt driving apparatuses. For example, one method provides a course regulating member to the belt so as to regulate a course of the belt. Typically, the course regulating member is disposed with glue around an edge of the belt so as to move along the edge of a roller that drives the belt. A drawback of this method, however, is the structural brittleness of the member which must withstand a relatively large force that acts on the belt when it is out of alignment, which may cause the course regulating member to flake off, or to overstride the roller. The course regulating member may alternatively be mounted on an edge of the roller. In this case, however, the belt may receive an excessive pressure at an edge thereof, thereby being damaged by the course regulating member when the belt receives a relatively great force that acts on the misaligned belt.

Another method, for example, uses a roller which is capable of tilting so as to adjust the displacement of the belt. This method requires costly components such as a magnetic clutch or solenoid, or the like. Some other methods, for example, are described in Japanese Patent Laid-open Publication Nos. 5-14046/1993 and 4-121337/1992. The former uses a belt which is provided with a reinforcement on the edge of the belt. The latter uses a distortion detector that detects a distortion of the belt and a string that is wound and released, in accordance with belt distortion, so as to tilt a roller in a way to absorb the belt distortion. In this method, the belt may cause a relatively larger friction when overstriding the distortion detector, which results in a damage to the belt in a relatively short time period. In addition, this method suffers a difficulty in assembling parts, especially in installing the string into the belt driving apparatus. Furthermore, the string may erroneously become unwound when the belt driving apparatus is in operation.

Therefore, it is understood that there is no known belt driving apparatus which is capable of preventing belt distortion during rotation, eliminating the above-described problems, and preventing the damage to the belt edge due to the frictional wear.

SUMMARY OF THE INVENTION

The present invention has been made in view of the above-discussed problems and an object of the invention is to address and resolve these and other problems.

Accordingly, a novel belt driving apparatus includes, an endless belt which is wrapped around and stretched between at least a driving roller and a driven roller, a belt shift detecting member for detecting a shift of the endless belt and being rotatably supported by the driven roller by a first end of a shaft thereof, the belt shift detecting member rotating free from a rotation of the drive roller. The apparatus also includes a supporting device supporting the first end of shaft of the driven roller and being displaceable in a direction perpendicular to a direction of the shaft of the driven roller, and a conversion device converting a displacement of the first end of the shaft of the driven roller into a displacement in a predetermined direction perpendicular to shaft of the driven roller when the endless belt is brought into contact with the belt shift detecting member and belt shift detecting member has a rotation torque. The conversion device comprises a secured member which is mounted on a main body side of the apparatus, so as to contact a part of the belt shift detecting member when the belt shift detecting member rotates to a predetermined angle caused by the rotation torque, and a cam configured to convert the rotation of the belt shift detecting member into a linear movement, when the belt shift detecting member rotates to a predetermined angle.

The belt driving apparatus preferably includes a first stopping member mounted on a main body side of the apparatus, and a second stopping member configured for stopping the rotation of the belt shift detecting member by engaging with the first stopping member when belt shift detecting member rotates to a predetermined angle, the second stopping member being mounted on the belt shift detecting member.

The supporting device may further include a shaft-end-portion supporting member supporting the first end of the shaft of the driven roller, a belt tensioning member for tensioning the endless belt stretched between the pair of driving and driven rollers and maintaining the endless belt in a predetermined position, and a for guiding member guiding the shaft-end-portion supporting member in the predetermined direction perpendicular to the shaft of the driven roller and in a direction in which the belt is made tensioned.

The guiding member may have an approximately oval-shaped aperture extending in the direction in which belt is stretched and in the predetermined direction in which the shaft-end-portion supporting member is guided. The endless belt may be a fixing belt that conveys a recording paper to a toner fixing position at which a toner is fixed on a recording paper. The driven roller may be a heating roller that heats the fixing belt and includes a heat source therein. The driving roller may be a fixing roller. The belt driving apparatus may further comprise a pressure roller for forming a fixing nip portion, by contacting the fixing roller with pressure via the fixing belt.

The belt driving apparatus may further comprise a guide member which is brought into contact with an inner circumferential surface of the fixing belt, the guide member being provided at a side of the inner circumferential surface of the fixing belt between the heating roller and the pressure roller in parallel with the fixing roller and pressure roller. The fixing belt conveying speed of the fixing belt is not greater than a conveying speed of a conveying device for conveying the recording paper to the fixing nip portion The novel method according to the present invention includes the steps of stretching a belt having an endless belt configuration between a driving roller and a driven roller, detecting a shift of the endless belt by use of a belt shift detecting member which is rotatably supported on a first end of a shaft of the driven roller, supporting the first end of the shaft of the driven roller displaceably to a direction perpendicular to the end portion of the shaft of the driven roller, displacing an end portion of the shaft of the driven roller in a direction perpendicular to a shaft direction thereof, and converting a rotation movement of the belt shift detecting member to a linear movement thereof.

Other objects, features and advantages of the present invention will become apparent from the following detailed description when read in conjunction with the accompanying drawings. Furthermore, while the drawings and descriptions illustrate specific structures, the present specification clearly explains the functions, concepts and attributes of the present invention in sufficient detail so as to make clear all equivalent structures and techniques for obtaining the desired result.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
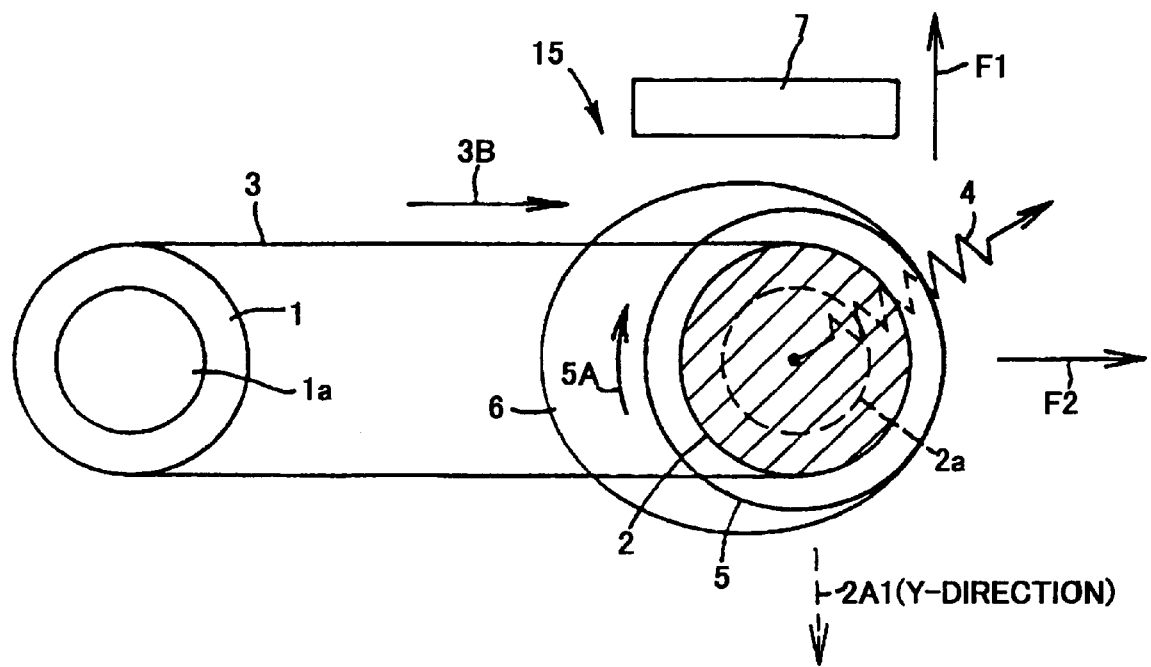
FIG. 1 is a partial cross-sectional front view showing the main part of the belt driving apparatus in a first embodiment of the present invention.

The embodiments of the present invention are described referring to the drawings, in which same reference numerals are respectively attached to the structure parts having same function and same shape through overall respective embodiments. Thereby, the explanation thereof is omitted as much as possible. In those figures, as to the structural parts constructed in the state of a couple in the figures and not necessary to be explained in particular by distinguishing them, only one of the couples is appropriately described instead of both in order to simplify the description thereof.

At first, referring to FIGS. 7 through 11, the structure of the belt driving apparatus applied to the present invention is described hereinafter.

Figure 7:
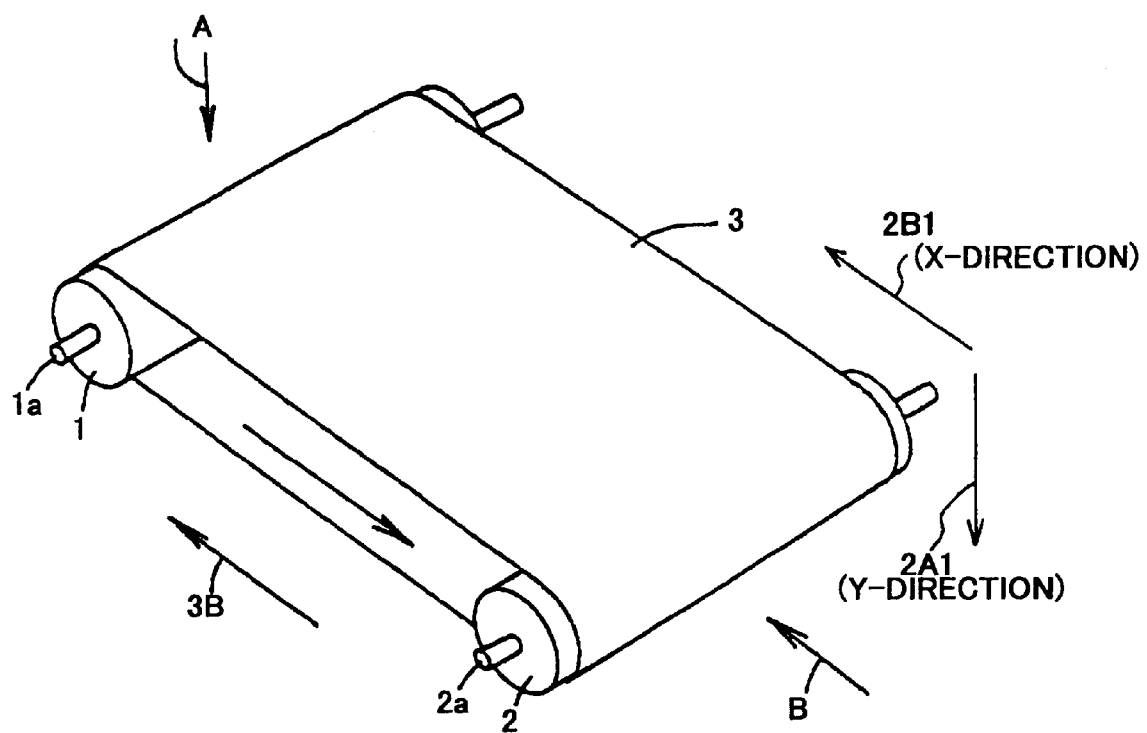
FIG. 7 is a perspective view showing the main part of the belt driving apparatus applied to the present invention.

FIG. 7 shows a belt driving apparatus of the present invention. The belt driving apparatus is mainly constructed with at least one driving roller 1, at least one driven roller 2, and an endless belt 3 wrapped around and tightly stretched between driving roller 1 and driven roller 2. Driving roller 1 and shaft 1a thereof are integrally formed. Driven roller 2 and shaft 2a thereof are also integrally formed. Driving roller 1 and driven roller 2 are respectively held for clockwise rotation relative to the main body of the apparatus through shafts 1a and 2a.

Figure 10:
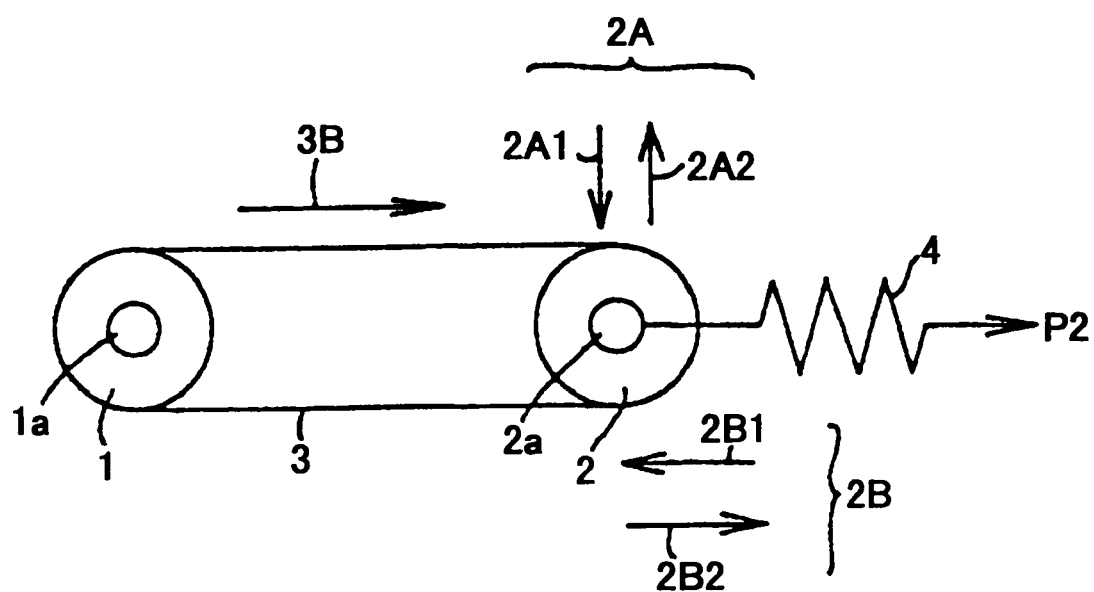
FIG. 10 is a side elevational view showing the outline of the belt driving apparatus structure shown in FIG. 7.

A flat belt having a relatively large width is employed as the belt 3 as shown in FIG. 7. Belt 3 is in the state of being rotatably conveyed in the direction 3B of the belt rotation which is clockwise direction. As shown in FIG. 10, belt 3 is stretched with a predetermined tension P2 applied thereto by use of a spring 4 (tension spring) employed as the belt tensioner member hung across the supporting portion of the shaft 2a of the driven roller 2 and the secured portion (not shown) provided at the side of the main body of the belt driving apparatus.

Figure 3:
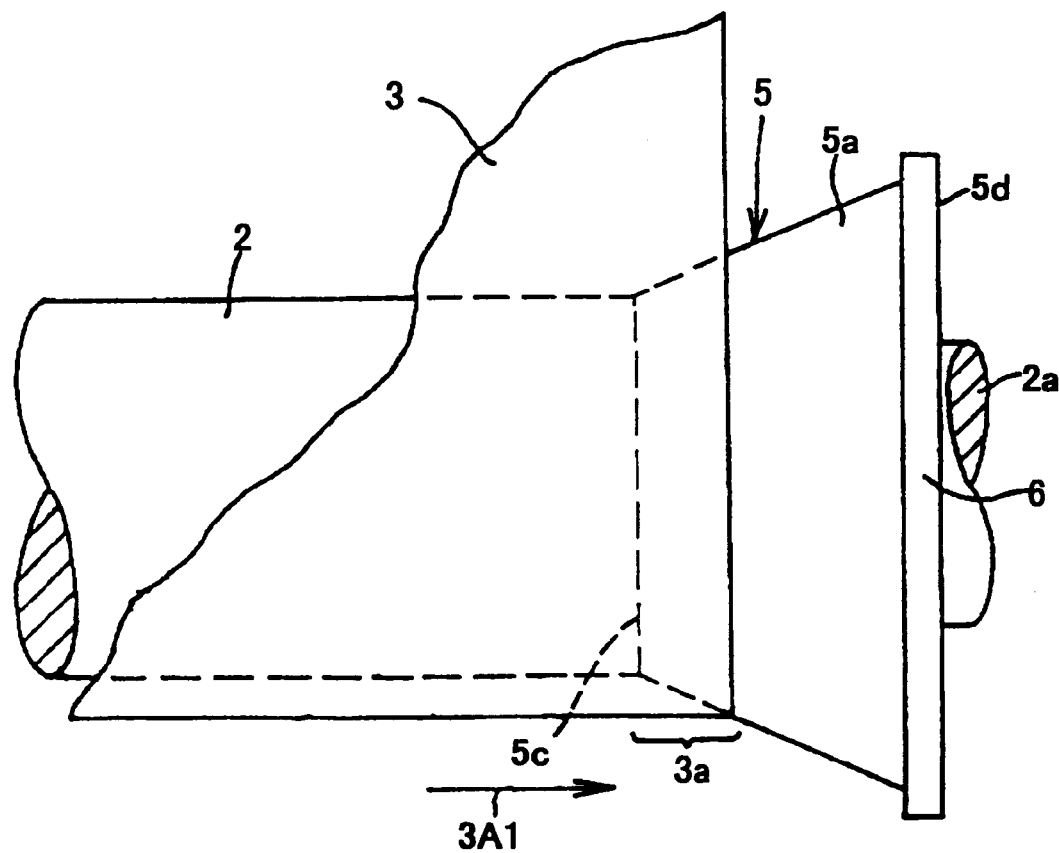
FIG. 3 is a plan view showing the main part of FIG. 1.
Figure 5:
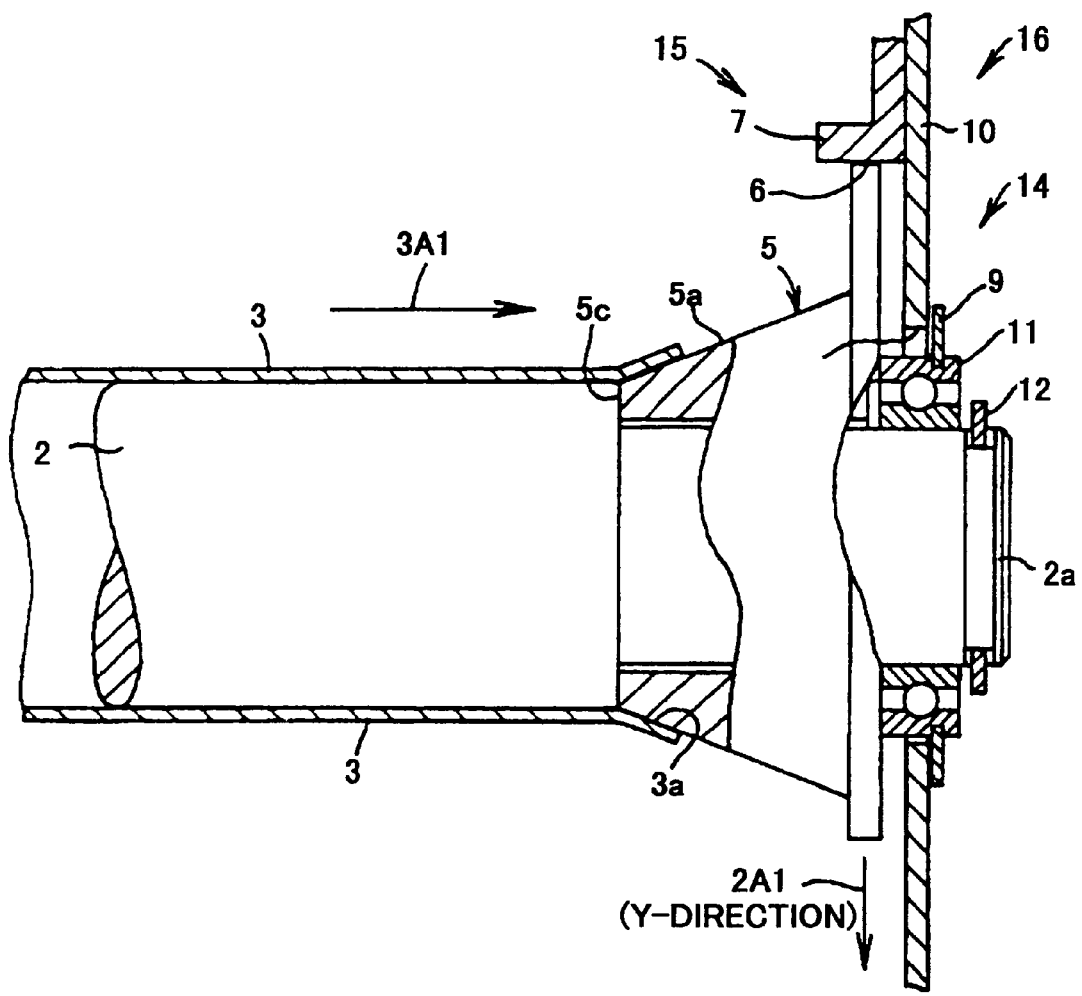
FIG. 5 is a partial cross-sectional side view illustrating the belt shift operation of the belt driving apparatus of the first embodiment.

As shown in FIGS. 3 and 5, the side end portion of the belt 3 represents a portion of a small area in the vicinity of the side edge portion including both of the side end portions of the belt 3 and the side end surface thereof, while the side edge portion of the belt 3 represents a portion of larger area than the above-mentioned side end portion of the belt 3.

Figure 8:
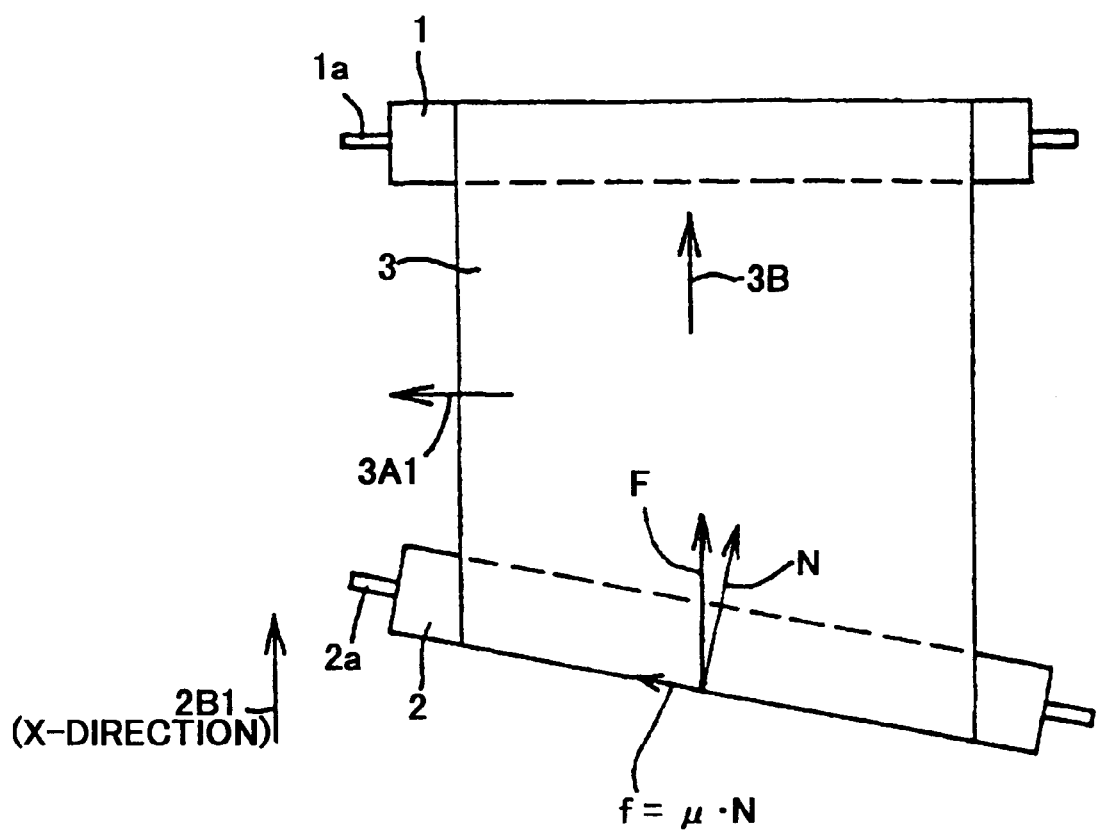
FIG. 8 is a plan view of the belt driving apparatus shown in FIG. 7 from the direction of the arrow A.

FIG. 8 is a plan view of the belt driving apparatus shown in FIG. 7 as viewed from the direction of arrow A (from above). FIG. 8 shows a state, in which the left-side end portion of the driven roller 2 is displaced towards driving roller 1, along direction 2B1 (in other words, "in the X direction"). In this state, driven roller 2 and driving roller 1 are non-parallel.

In FIG. 10, the state in which the left end portion of the shaft of the driven roller 2 is displaced in the non-parallel right direction 2B2 is illustrated together with the non-parallel left direction 2B1. Both of the non-parallel right and the non-parallel left directions 2B2 and 2B1 are generally called the "non-parallel direction 2B".

Figure 9:
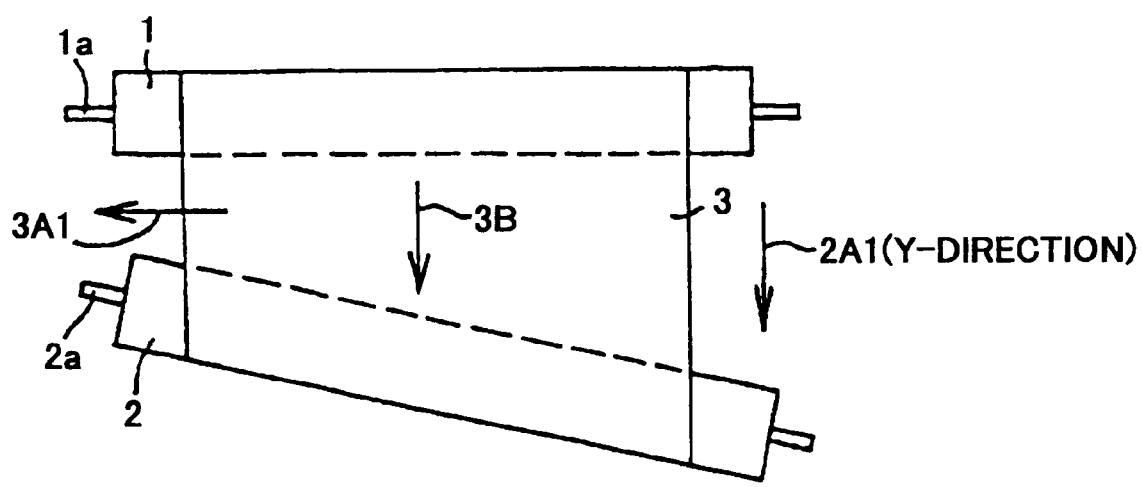
FIG. 9 is a front elevational view of the belt driving apparatus shown in FIG. 7 from the direction of arrow B.

FIG. 9 is a front view of the belt driving apparatus shown in FIG. 7 as viewed from the direction of arrow B. FIG. 9 shows the state in which the right end portion of the shaft of the driven roller 2 is displaced in the twisting downward direction 2A1, that is, the downward displacement direction (in other words, "the Y direction perpendicular to the X direction"). The positional relationship between the driven roller 2 and the driving roller 1 is that the former is put in the state of twisting to the driving roller 1.

In FIG. 10, the state in which the right end portion of the shaft of the driven roller 2 is displaced in the twisting upward direction 2A2, that is, the upwards displacement direction is illustrated together with the twisting downward direction 2A1. Both of the twisting downward direction 2A1 and the twisting upwards direction 2A2 are generally called the "twisting direction 2A".

In a case that the driven roller 2 and the driving roller 1 are in the non-parallel positional relationship as shown in FIG. 8, the phenomenon of the belt shift is that the belt 3 shifts to the direction where the driven roller 2 approaches to the driving roller 1, as shown by the belt shift direction 3A1. The component of force F in a longitudinal direction of the shaft of the driven roller 2 among the driving force transmitted to the belt from the driving roller 1 is applied to the belt 3 as the friction force f between the inner circumferential surface of the belt 3 and the surface of the shaft of the driven roller 2 in a longitudinal direction.

Relevant to the description as stated above, the friction force f satisfies the following equation:

f=$\mu$·N, in which $\mu$ represents the friction coefficient between the inner circumferential surface of the belt 3 and the outer circumferential surface, and N is a force exerted onto the shaft 2a of the driven roller 2 perpendicular to the driven roller 2.

Since the belt shift force is caused due to the friction force between the inner circumferential surface of the belt 3 and the outer circumferential surface of the driven roller 2, the magnitude of the friction coefficient u relates to the above-mentioned belt shift force. In this case, when the condition of the contact surface between the inner circumferential surface of the belt 3 and the outer circumferential surface of the driven roller 2 changes, the belt shift force tends to change during the time period from the initial time to the elapsed time due to the variation of the friction coefficient $\mu$.

Thereby, the belt shift force is not stable. Generally, when the time elapses, the friction coefficient $\mu$ increases and the belt shift force of a belt tends to increase.

Further, when driven roller 2 and the driving roller 1 are put in the twisting positional relationship as shown in FIG. 9, where driven roller 2 is displaced downward in the twisting downward direction 2A1 and the belt 3 is rotatably conveyed in a belt rotating direction 3B as explained in the first embodiment and so forth described later, the belt 3 shifts in the belt shift direction 3A1 which is toward the same direction where belt 3 previously shifted.

It is assumed that belt 3 shifts in a direction in which the twisting phenomenon occurs when the belt 3 is wrapped around the driven roller 2. In this case, the amount of shift of the belt 3 is such that a slight twist of the driven roller 2 relative to the driving roller 3 surely causes a belt shift.

Figure 11:
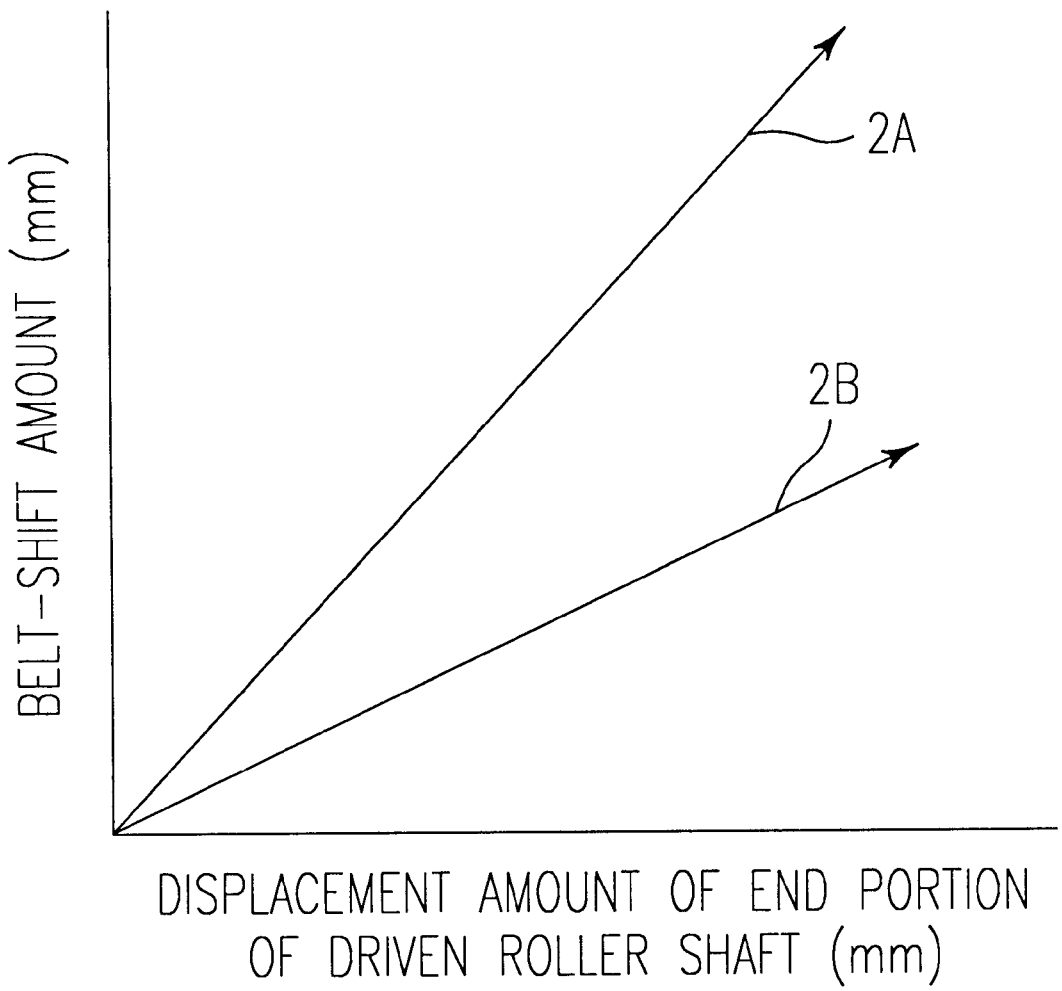
FIG. 11 is a graph showing the result of confirming the result of the belt shift at the time of displacing the end portion of the driven roller shaft on the condition of constructing the belt driving apparatus shown in FIG. 10.

FIG. 11 represents the results of confirming the amount of the belt shift at the time of displacing the end portion of the shaft of the driven roller 2 in the non-parallel direction 2B and the twisting direction 2A, on the condition of constructing the belt driving apparatus as shown in FIGS. 7 and 10.

As is apparent from FIG. 11, it is understood that the twisting component (in the twisting direction 2A) has a greater impact on belt shift than the parallel component (in the non-parallel direction 2B). The above fact has been confirmed by the experiment. From the result of the above-mentioned experiment, in the case of intending to prevent the belt shift by displacing the driven roller 2, it is preferable for optimal prevention of belt Taxation and the belt shift control, to displace driven roller 2 in the twisting direction 2A.

In the case of the embodiment (described below) for a belt shift preventing method, an end of the shaft of the driven roller 2 on the side towards the direction of the belt shift, is displaced in the twisting downward direction 2A1 as the predetermined direction.

The First Embodiment

FIGS. 1 through 6 show the first embodiment of the present invention.

The belt driving apparatus relevant to the first embodiment, as shown in FIGS. 1 through 6, is mainly composed of the following: at least one driving roller 1; at least one driven roller 2; an endless belt 3 wrapped around the driving roller 1 and the driven roller 2; a belt shift detecting member 5 for detecting the shift of the belt 3, which is rotatably supported on both of the end portions of the shaft of the driven roller 2, and which is independently supported from the driven roller 2; a supporting member 14 for displaceably supporting the end portion of the shaft of the driven roller 2 in a direction perpendicular to the longitudinal direction of the shaft thereof; and a conversion device 15 for converting the displacement of the end portion of the driven roller shaft 2a to that in the predetermined direction perpendicular to the longitudinal direction of the shaft 2a when the belt 3 is brought into contact with the belt shift detecting member 5 and thereby exerting a rotation torque on the belt shift detecting member 5.

Such basic structure for preventing the belt shift in the first embodiment, i.e., the structure composed of the belt shift detecting member 5, the supporting member 14, and the conversion device 15 is generally called a belt shift preventing device 16.

Figure 2:
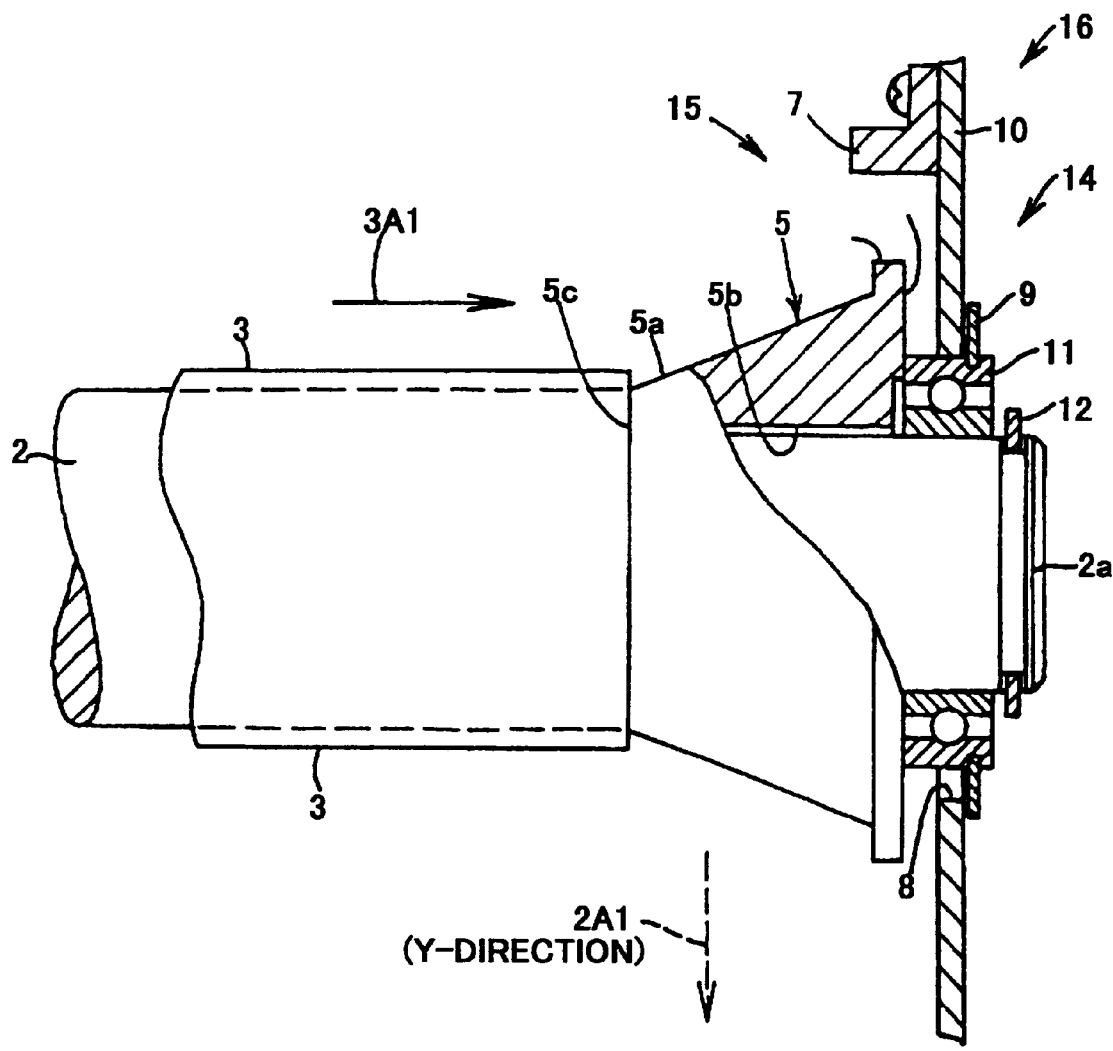
FIG. 2 is a partial cross-sectional side view showing the main part of FIG. 1.

The belt shift detecting member 5 is coaxially mounted on the shaft 2a of the driven roller 2 so as to freely rotate thereon being supported in a state independent from the rotation of the driven roller 2, as shown in FIGS. 1, 2 and 5.

The belt shift detecting member 5 is formed in a truncated cone shape having a tapered surface 5a. The narrow end of the tapered surface 5a is proximate to the end surface of the driven roller 2, while the larger end of the tapered surface 5a is distal from the end surface of driven roller 2. Since the belt shift detecting member 5 is formed in a truncated cone shape having such a tapered surface 5a, as the contact between belt 3 and member 5 increases, a rotation torque transmitted to belt shift detecting member 5 proportionally increases. The contact is caused when the belt 3 shifts in the belt shift direction 3A1, and thereby comes into contact with, and runs upon the belt shift detecting member 5.

The belt shift detecting member 5 is composed of a fitting portion 5b for loosely fitting onto shaft 2a of driven roller 2. An inside end surface 5c of member 5 opposes the end surface of the driven roller 2. An outside end surface 5d of member 5 contacts a surface of an outer casing of the ball bearing 11. A cam 6 is integrally provided on the outer circumferential portion of the outside end surface 5d which is a part of the belt shift detecting member 5 respectively, as shown in FIG. 2 in detail.

The cam 6 has a function of converting a rotation movement of the belt shift detecting member 5 to a linear movement thereof. The cam 6 is an eccentric cam having a large-diameter portion that is brought into contact with and engaged with a fixed member 7 as described later. The outer diameter of the inside end surface 5c of the belt shift detecting member 5 is equal to or slightly smaller than the outer diameter of the driven roller 2. The tapered surface 5a is preferably formed with an inclination angle of 1° through 6° so as to prevent buckling of the side end portion of the belt 3.

The inclination angle of the tapered surface 5a is illustrated in an exaggerated manner in FIGS. 1 through 6 for illustrative purposes only. The outside end surface 5d of the belt detecting member 5 is hollowed at the center part which faces the outer circumferential surface of the shaft 2a of the driven roller 2 in order to contact the surface of the outer casing of the ball bearing 11, as shown in FIGS. 2 and 5.

Each of the fitting portion 5b, the inside end surface 5c, and outside end surface 5d of the belt shift detecting member 5 are respectively designed so as to decrease the contact area in consideration of the sliding friction with the opponent member to be contacted.

As to the material of the belt shift detecting member 5, so-called engineering plastics such as polyimide resin (PI), polyphenylene sulfide resin (PPS) and so forth are preferably employed since a metal belt shift detecting member 5 may cause buckling when contacting the side end portion of the belt 3.

The supporting member 14 is composed of the ball bearing 11 which is employed for supporting both of the end portions of the shaft of the driven roller 2, a spring 4 employed as the belt energizing, stretching or "tensioning" member for biasing the belt 3 toward the predetermined position, and a side plate 10 employed as the guiding member for guiding the ball bearing 11 in the twisting downward direction 2A1 as the predetermined direction. One supporting member 14 is provided at each side of the shaft of driven roller 2.

Figure 4:
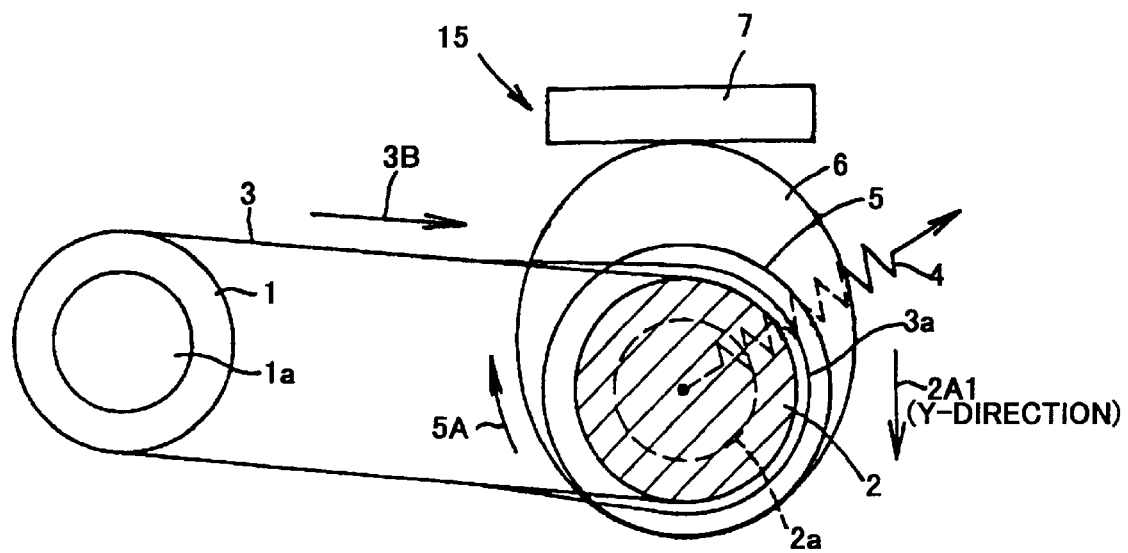
FIG. 4 is a partial cross-sectional front view showing the belt shift operation of the belt driving apparatus of the first embodiment.
Figure 6:
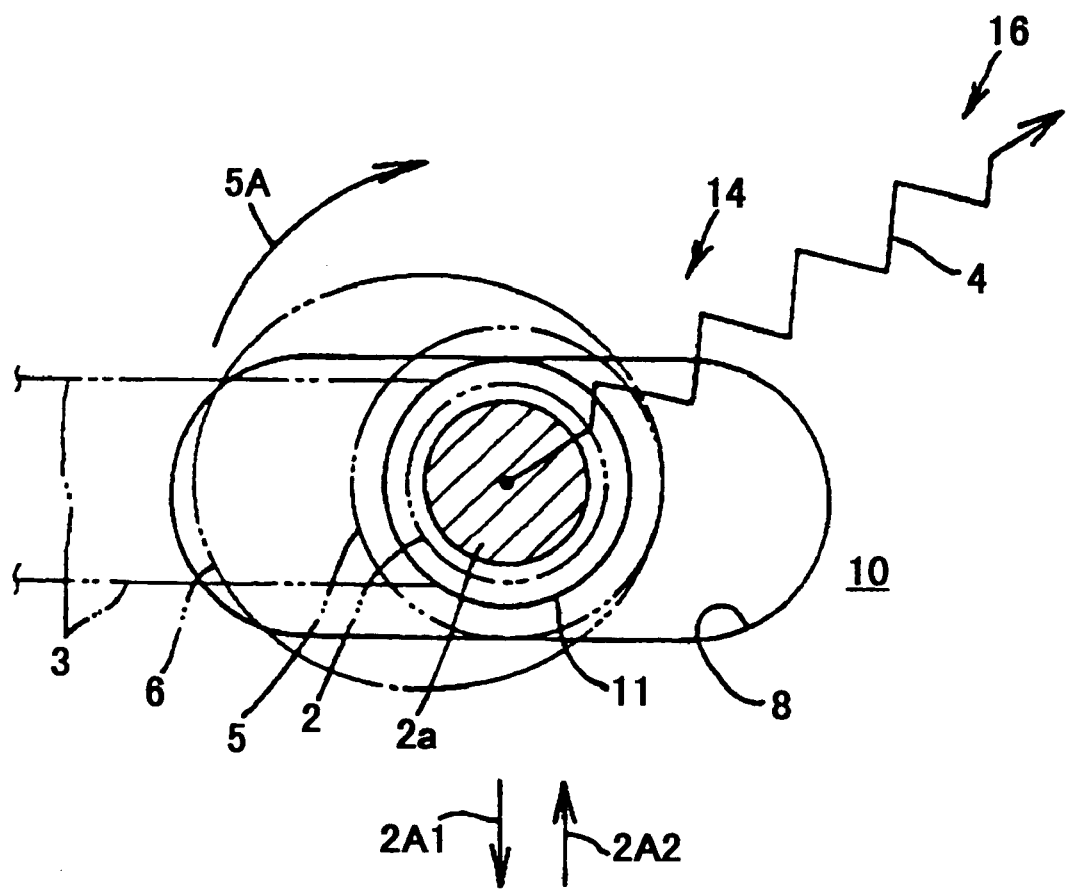
FIG. 6 is a front cross-sectional view showing the main part of the belt driving apparatus in the state of arranging the parts around the long hole of the apparatus of the first embodiment.

The spring 4 is provided for energizing the ball bearing 11 in an obliquely upward direction, as shown in FIGS. 1, 4, and 6, which is disposed at both ends of the driven roller 2, i.e., the stretching direction for the belt 3.

As shown in FIG. 1, F1 represents the component of force F of the spring 4 which biases the driven roller 2 toward the predetermined position, and F2 represents another component of force F for stretching the belt 3 in the predetermined direction.

A ball bearing which has a realtively small rotation load when rotatably supporting the end portion of the shaft of the driven roller 2, is preferably employed as the aforementioned ball bearing 11. Both end portions of the shaft 2a of the driven roller 2 are supported by the ball bearing 11 which is mounted on the side plate 10 via the bearing supporting plate 9. The bearing supporting plate 9 is inserted into the outer casing of the ball bearing 11. The ball bearing 11 is loosely inserted into a long hole 8 of the side plate 10. Thereby, the ball bearing 11 is guided and supported displaceably in the twisting downward direction 2A1.

Furthermore, both end portions of the shaft 2a of the driven roller 2 are prevented from being drawn out by stopper 12 (stop ring) such as C-ring, E-ring, and the like mounted on and tightly engaged with both end portions thereof.

As shown in FIGS. 2, 5 and 6, there is formed the guide hole 8 on the side plate 10 extending in the tensioning direction of the belt 3 and in the twisting downward direction 2A1 as the predetermined direction of displacing the end portion of the shaft of the driven roller 2 through the ball bearing 11. Guide hole 8 is formed on the predetermined position of the side plate 10 with a distinctive shape.

The conversion device 15 includes the secured member 7 mounted on the side plate 10 as a side of a main body of the apparatus so as to come into contact with the large-diameter portion of the cam 6 of the belt shift detecting member 5 when the belt shift detecting member 5 rotates to a predetermined angle which is caused by the rotation torque exerted thereon by a shifted belt 3. The conversion device 15 further includes cam 6 that converts the rotation movement of the belt shift detecting member 5 into a linear movement. Cam 6 is mounted on a portion of the belt shift detecting member 5 as mentioned above. The conversion device 15 is provided at both ends of the driven roller 2.

Next, the operation of the above-mentioned structure is described hereinafter.

As shown in FIGS. 1 and 2, when the belt 3 moves to the belt shift direction 3A1 due to an occurrence of the belt shift during a rotation of the belt 3, an edge of belt 3 is brought into contact with the belt shift detecting member 5. As shown in FIG. 5, the inner circumferential surface of the side edge portion 3a of belt 3 then overlaps the belt shift detecting member 5. If the inner circumferential surface of the side edge portion 3a overlaps belt shift detecting member 5, the inner surface of belt 3 rubs against tapered surface 5a of the belt shift detecting member 5. This causes a rotation torque to be transmitted to belt shift detecting member 5 and thereby causes the belt shift detecting member 5 to rotate in the detecting member rotating direction 5A as shown in FIGS. 4 and 5.

When the belt shift detecting member 5 rotates in the detecting member rotating direction 5A and the large-diameter portion of the cam 6 comes into contact with and engages secured member 7, the rotation movement of the belt shift detecting member 5 is converted to the linear movement thereof as a result.

In the first embodiment, the driven roller 2 is displaced in the twisting downward direction 2A1 indicated by a solid line as the predetermined direction perpendicular to that of the shaft 2a of the driven roller 2 as shown in FIGS. 5 and 6.

The twisting downward direction, indicated by arrow 2A1, represents the direction of the initial direction of displacement of the end portion of the shaft of the driven roller 2 at the initial time of the belt shift operation. When the displacement amount of the driven roller 2 decreases, the shifting amount of the belt 3 also decreases, and the cam 6 continues its rotation until the belt shift operation ceases.

The end portion of the shaft 2a of the driven roller 2 is rotatably supported by the ball bearing 1, resulting in low rotation load, while guide hole 8 provides clearance allowing up-and-down, as well as right-and-left movement, as shown in FIG. 6. When the driven roller 2 is displaced in order to prevent the belt shift, the roller 2 is smoothly displaced with the small force as a result of absence of the friction resistance force.

In a state of small rotation torque, i.e., in the state that the side edge portion 3a of the inner circumferential surface of the belt 3 only slightly overlaps the belt shift detecting member 5, the wear of the belt is reduced and the breakdown of the side end portion of the belt 3 can be prevented. In addition, the belt shift preventing function can further surely be performed. Those are the advantages of the present invention.

The above-mentioned operation will now be summarized. Belt shift occurs during the rotation of the belt 3, and the side end portion of the belt 3 is therefore brought into contact with the belt shift detecting member 5. Thereafter, when the side edge portion 3a of the inner circumferential surface of the belt 3 runs upon the belt shift detecting member 5, the side edge portion 3a of the inner circumferential surface of the belt 3 contacts belt shift detecting member 5. A rotation torque is thereby transmitted to belt shift detecting member 5. At this moment, the rotation movement of the belt shift detecting member 5 is converted to the linear movement thereof by the rotation and contact of cam 6 with secured member 7. Thereby one side end portion of the driven roller 2 is displaced in the predetermined direction which is perpendicular to that of the shaft 2a of the driven roller 2 in order to stop the belt shift.

The belt shift detecting member 5 which includes cam 6, rotates until the belt shift is stopped according to the displacement of the driven roller 2. As described before, the first embodiment of the invention relates to the belt shift preventing technology utilizing the aforementioned structure and operation.

Consequently, according to the first embodiment, belt shift that occurs during the rotation of the belt 3 can be prevented by utilizing the operation/function of the belt driving apparatus including the aforementioned belt shift preventing device 16. Further, even though the belt 3 is rotated and conveyed for a long time, shortening of the life of the belt 3 due to the cracking and/or breakage at the side end portion of the belt 3 caused by a contact between the side edge portion 3a of the belt 3 and the belt shift detecting member 5 can be prevented.

Furthermore, when the belt shift preventing function is performed, the driven roller 2 is displaced in the twisting downward direction 2A1 as the predetermined direction of the first embodiment for preventing the belt shift. This is because of the aforementioned special shape of guide hole 8 formed on the side plate 10.

However, it is an advantage that the driven roller 2 can easily be displaced by eliminating the friction resistance force that occurs at that time by using the ball bearing.

Furthermore, when the belt 3 is conveyed, a rotation torque is exerted on the driven roller 2 around the driving roller 1 as the fulcrum by the action of the tension in accordance with the rotation of the belt 3 and thereby the force of moving in the downward direction is exerted on the driven roller 2 on some occasions. At this moment, since the ball bearing is employed as the ball bearing 11 for supporting the shaft 2a of the driven roller 2, the force to move the driven roller 2 downward becomes quite small even though the rotation torque is exerted to the driving roller 1 as the fulcrum.

Consequently, when the belt 3 is conveyed, there is no possibility of unstable movement of the driven roller 2 against the biasing force of the spring 4. Furthermore, the guiding member of the present invention is not limited to the side plate 10 having guide hole 8 as provided in the first embodiment. As a guiding member, for example, a member having an opening for loosely guiding and supporting the ball bearing 11, which is formed of a configuration of approximately T shape that is disposed at the side plate 10, formed in a stretching direction of the belt 3 and in a extending direction to the twisting downward direction 2A1 where the ball bearing 11 is displaced, is applicable.

Alternatively, the groove-shaped body extending in both of the aforementioned directions can be used. Furthermore, guide hole 8 is not limited to the above-mentioned structure. Namely, any shape of the body extending in both of the aforementioned directions can be used. For example, an elliptic hole, long hole, or rectangular hole can be adopted.

Furthermore, in the first embodiment, a series of devices for constructing the belt shift preventing device 16 for preventing the belt shift is described in the case of disposing those series of devices at both of the sides of the driven roller 2. However, the devices are not limited to the above. It is possible to displace the driven roller 2 such that the belt 3 previously shifts to the one side of the driven roller 2, and to dispose the belt shift preventing device 16 only at one side of the driven roller 2.

Second Embodiment

The second embodiment according to the present invention is described hereinafter referring to FIGS. 12 through 16. The second embodiment differs from the first embodiment only in that the second embodiment further includes a stopping member 17 for stopping the rotation of the belt shift detecting member 5, and a stopping member 5e mounted on the belt shift detecting member 5 and engageable with the stopping member 17 to stop the rotation of the belt shift detecting member 5 when the belt shift detecting member 5 rotates by to predetermined angle.

The stopping member 5e is provided at the predetermined position of the belt shift detecting member 5 such that the peak of the large-diameter portion of the cam 6. In the second embodiment, the stopping member 5e is fixed to a position opposite to that the peak or the portion of maximum radius of the large-diameter portion of the cam 6.

The construction of the first embodiment may cause a problem in that, if the belt shift occurs during the rotation of the belt 3 and the friction force between the side edge portion 3a of the inner circumferential surface of the belt 3 and the belt shift detecting member 5 becomes excessively large, the peak of the large-diameter portion of the cam 6 mounted on the belt shift detecting member 5 may over-rotate and pass secured member 7. As the result, belt shift detecting member 5 may continue to rotate, and thereby cause drive roller 2 to rotate in a rocking manner. The second embodiment, however, prevents such a problem.

The fundamental structure for preventing the above-described over-rotation of cam 6, in the second embodiment is the structural unit constructed with the belt shift detecting member 5 provided with the stopping member 5e on cam 6, supporting member 14, conversion device 15, stopping member 17 and so forth is generally called as the "belt shift preventing device 16'.

Next, the operation of the second embodiment will be described hereinafter, focusing on the different points from the first embodiment.

Figure 12:
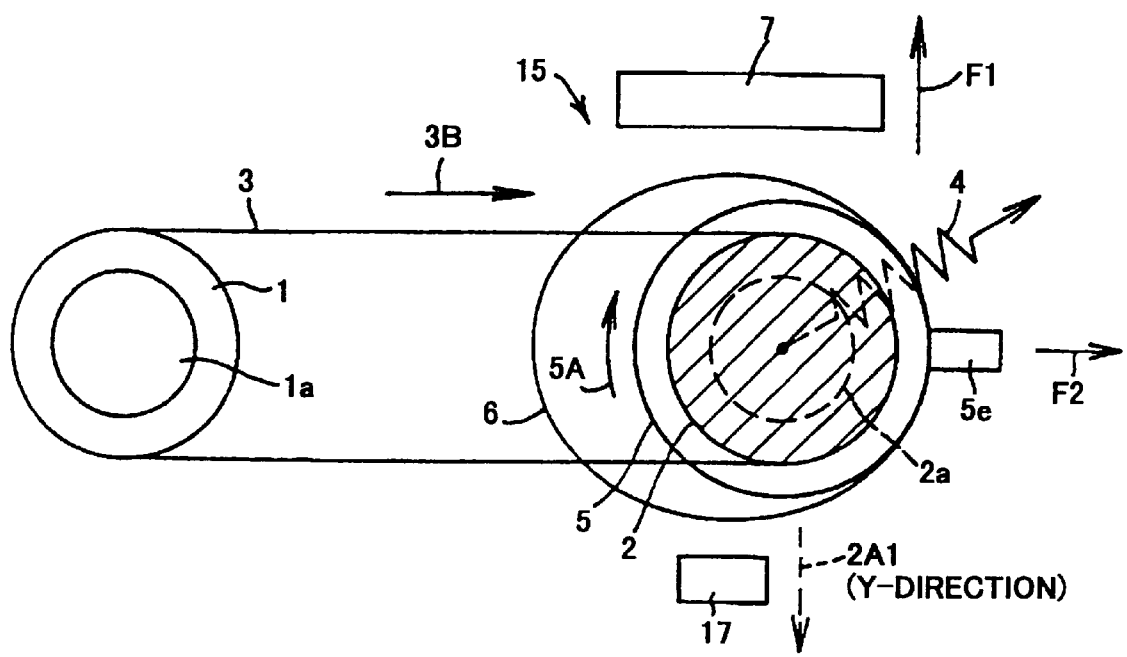
FIG. 12 is a partially cross-sectional front view showing the main part of the belt driving apparatus of the first embodiment according to the present invention.
Figure 13:
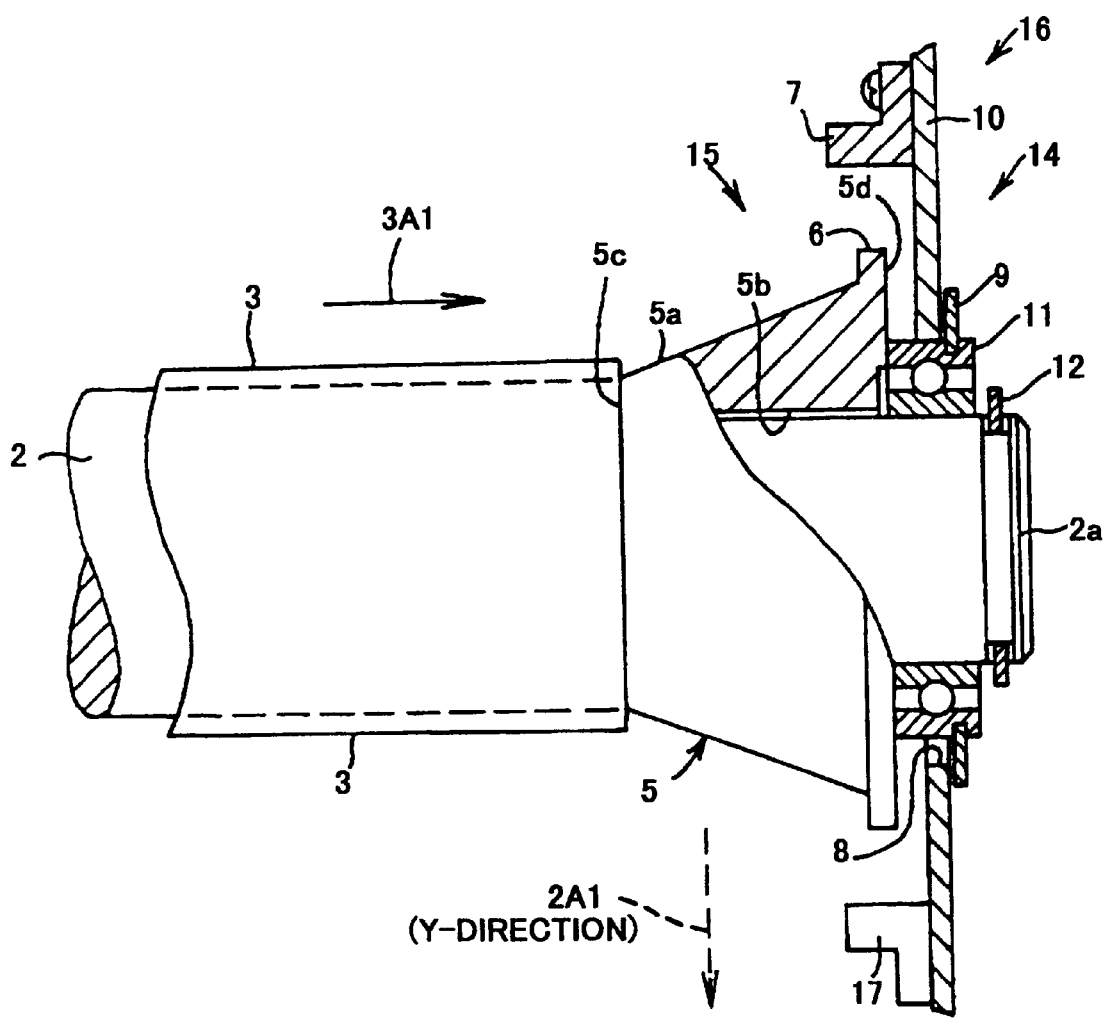
FIG. 13 is a partial cross-sectional side view showing the main part of FIG. 12.
Figure 14:
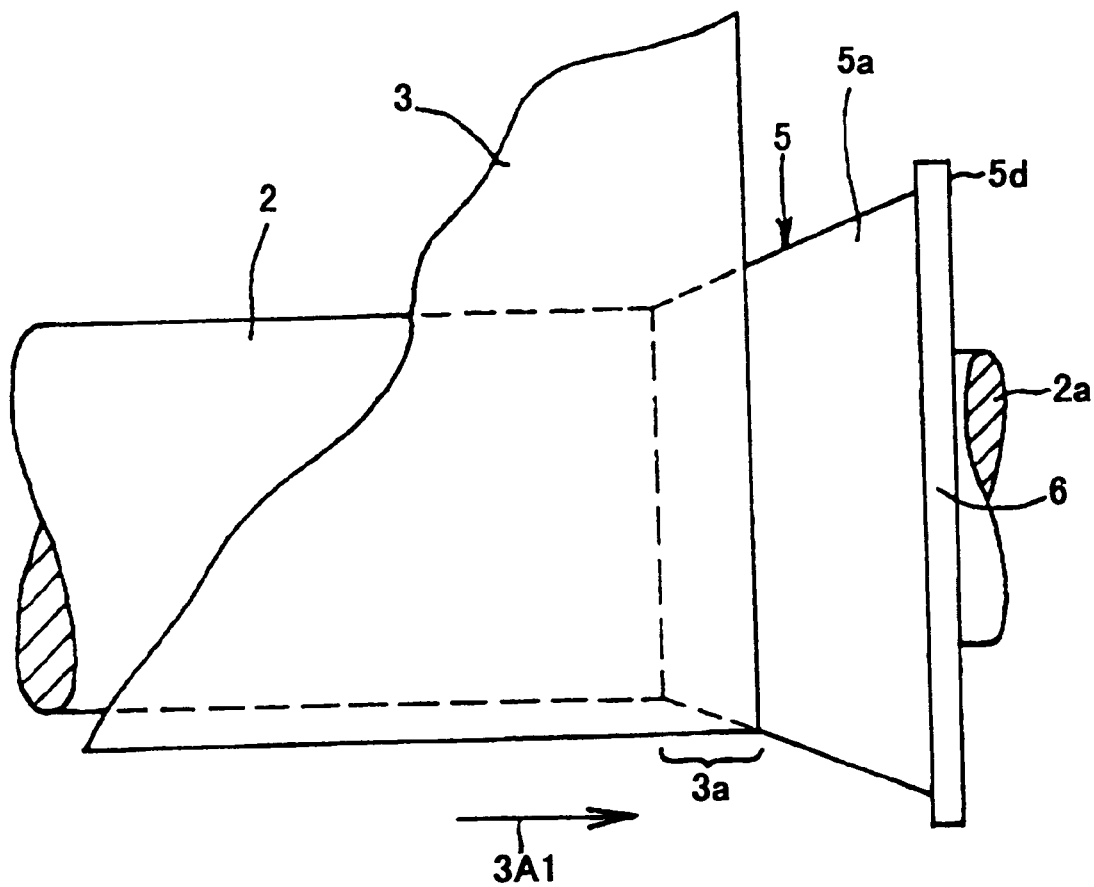
FIG. 14 is a plan view showing the main part of FIG. 12.

FIGS. 12 and 13 illustrate the belt shift that occurs during the rotation of the belt 3. When the belt 3 moves in the belt shift direction 3A1, an edge of belt 3 is brought into contact with the belt shift detecting member 5, and thereafter, the inner circumferential surface of the side edge portion 3a of the belt 3 overlaps belt shift detecting member 5 (see FIGS. 14 through 16).

When the inner circumferential surface of the side edge portion 3a of the belt 3 overlaps belt shift detecting member 5, the side edge portion 3a of the inner circumferential surface of the belt 3 rubs the tapered surface 5a of the belt shift detecting member 5. As the result, a rotation torque is transmitted to belt shift detecting member 5, thereby rotating belt shift detecting member 5 in direction 5A, as shown in FIG. 15.

As belt shift detecting member 5 rotates in a direction 5A, the large-diameter portion of the cam 6 eventually contacts and engages secured member 7. Upon engagement of cam 6 with secured member 7, the rotation movement of belt shift detecting member 5 is converted to linear movement, and the driven roller 2 is displaced in the twisting downward direction 2A1, shown as a broken line as the predetermined direction that is perpendicular to the shaft 2a of the driven roller 2.

Figure 15:
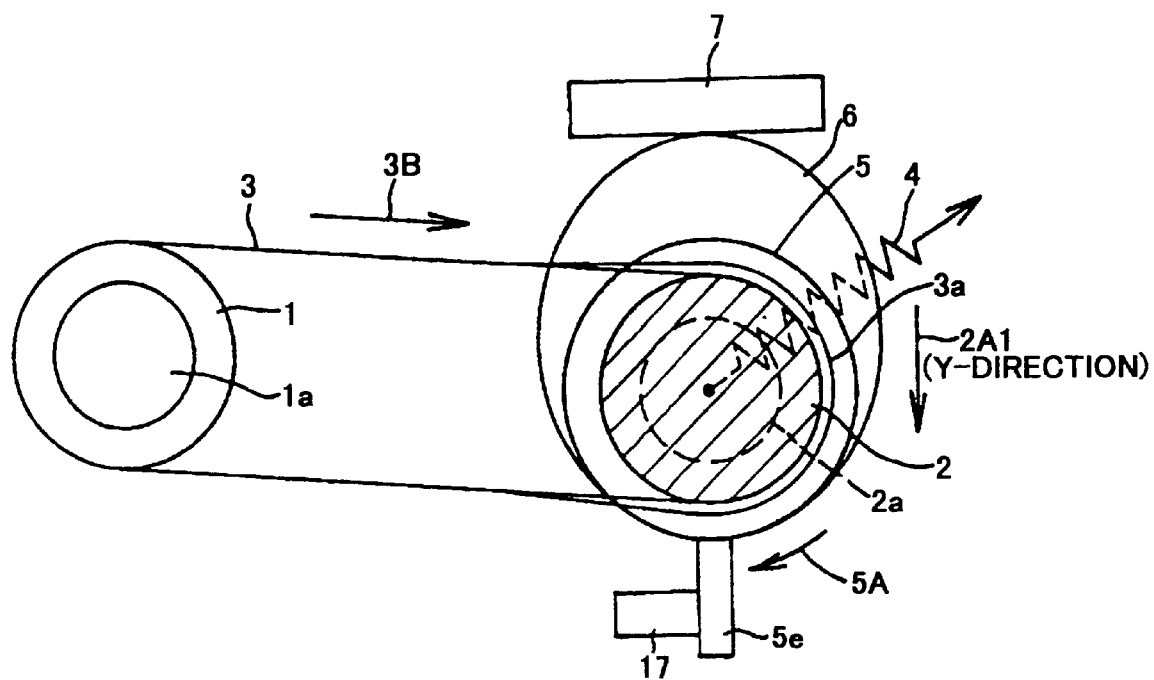
FIG. 15 is a partial cross-sectional front view illustrating the belt shift operation of the belt driving apparatus of the second embodiment.
Figure 16:
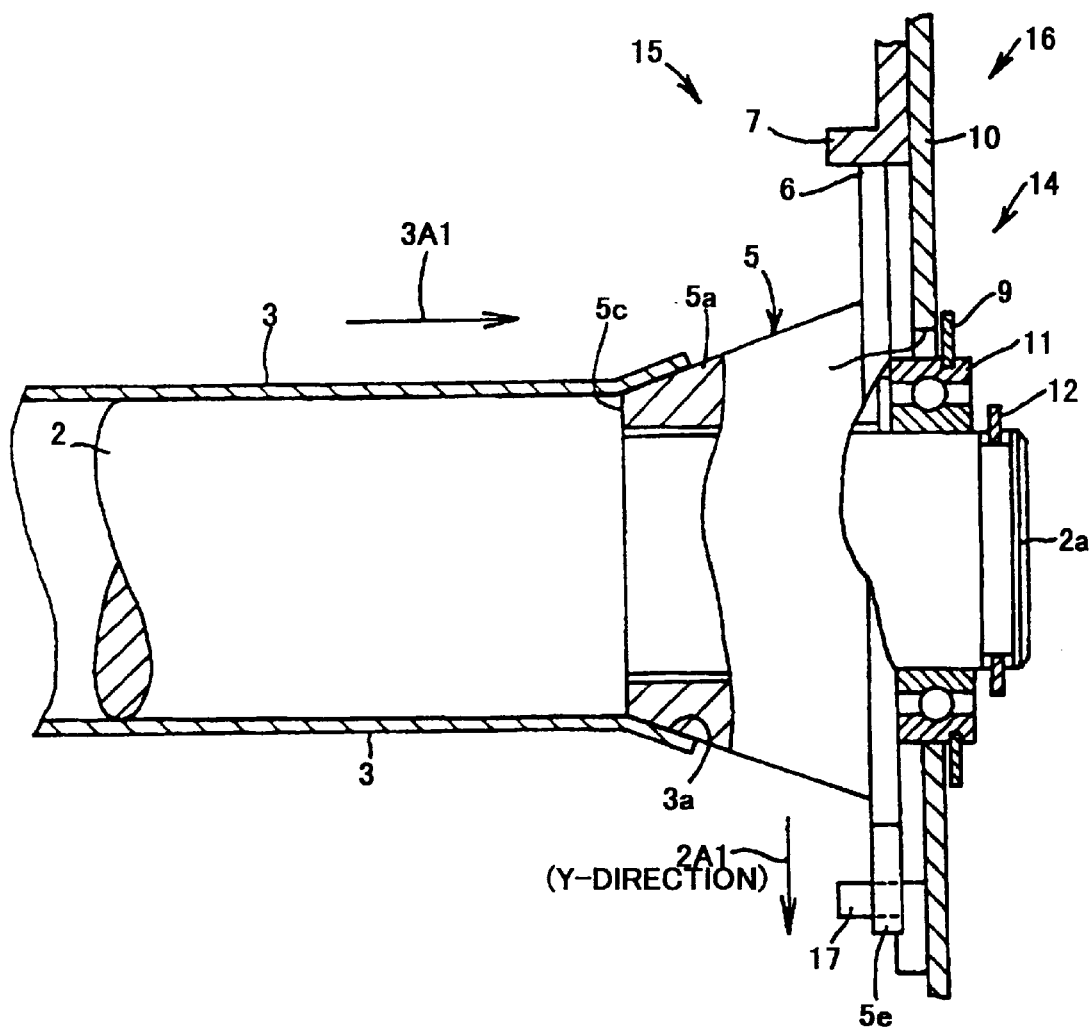
FIG. 16 is a partial cross-sectional side view illustrating the belt shift operation of the belt driving apparatus of the second embodiment.

As shown in FIGS. 15 and 16, when the peak of the large-diameter portion of the cam 6 of the belt shift detecting member 5 contacts and engages with the secured member 7, the stopping member 5e of the belt shift detecting member 5 touches the stopping member 17 and the rotation of cam 6 is restricted. Thereby, the rotation of the belt shift detecting member 5 is stopped.

Third Embodiment

Figure 17:
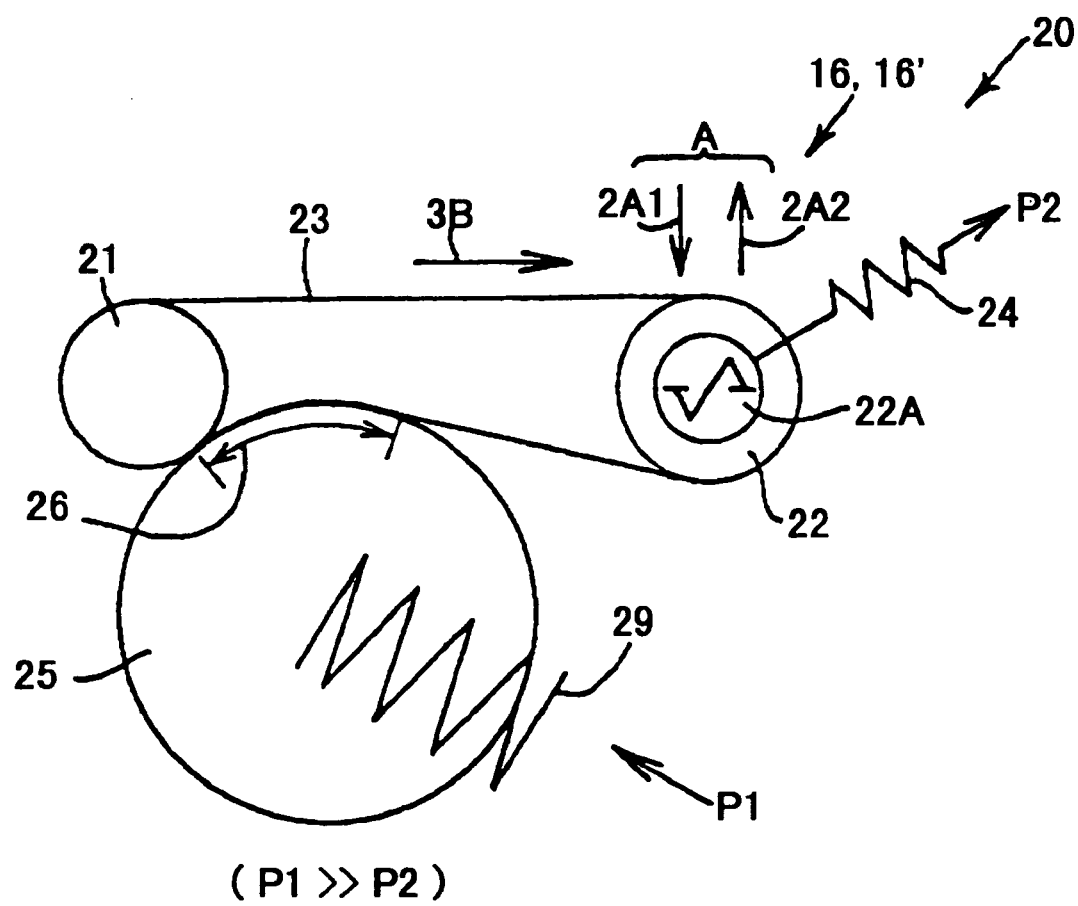
FIG. 17 is a side elevational view showing the main part of the belt fixing apparatus of the third embodiment.

The third embodiment according to the present invention is shown in FIG. 17. In the third embodiment, belt shift preventing device 16 or 16' of the aforementioned first or second embodiment is applied to the belt fixing apparatus 20 as shown in FIG. 17.

In FIG. 17, a heating roller 22 for heating the fixing belt, serves as the driven roller 2 as in the first and second embodiments, and includes a heat source 22A. Fixing roller 21, serving as the driving roller 1 as in the first and second embodiments. A fixing belt 23 for fixing the non-fixed toner on the recording paper functions as belt 3. A pressure roller 25 for forming a fixing nip portion 26 by bringing into contact with the fixing roller 21 through the fixing belt 23 is provided on the fixing roller 21. The belt shift preventing device 16 or 16' including a series of aforementioned structures and is provided on the shaft end portion of the heating roller 22.

A pair of springs 24 is provided at both ends of the shaft of the heating roller 22 so as to stretch the fixing belt 23 with the predetermined tension P2. A pair of pressure springs 29 is provided at both ends of the shaft of the pressure roller 25 so as to press the pressure roller 25 against the fixing roller 21 with the predetermined biasing force P1, through the fixing belt 23. Pressure roller 25 is biased into pressure contact with the fixing roller 21, through the fixing belt 23, by the action of the pressure springs 29.

Energizing force P1 of the pressure springs 29 is set to a value sufficiently larger than the tension P2 of springs 24.

In particular, the fixing belt 23 is formed of a film-state substrate attached with a mold releasing layer. The above-mentioned substrate is made of polyimide, nickel, stainless steel, iron and so forth, because heat-proofness and heat responsibility are required for the substrate. The thickness of the substrate is preferably determined within the range of approximately 30 through 300 $\mu$m. However, if such a thin fixing belt 23 is affected by the thermal stress, the strength thereof is lowered. Compared with the case of employing at the normal temperature, the wrinkles and the buckling often and easily occur. Thereby, the side end portion of the fixing belt tends to suffer from the cracking breakage.

Belt fixing apparatus 20 provided as such prevents belt shift, reduces belt shifting force and eliminates the cracking breakage at the side end portion of the fixing belt 23. As a result, the durability of the fixing belt 23 can be improved.

The material of the aforementioned respective structural parts is selected in consideration of the heat-proofness required for the belt fixing apparatus 20. For example, as to the material of the belt shift detecting member 5 provided with the cam 6, engineering plastics and so forth, such as, polyimide resin (PI) or polyphenylene sulfide may be preferably employed.

Fourth Embodiment

Figure 18:
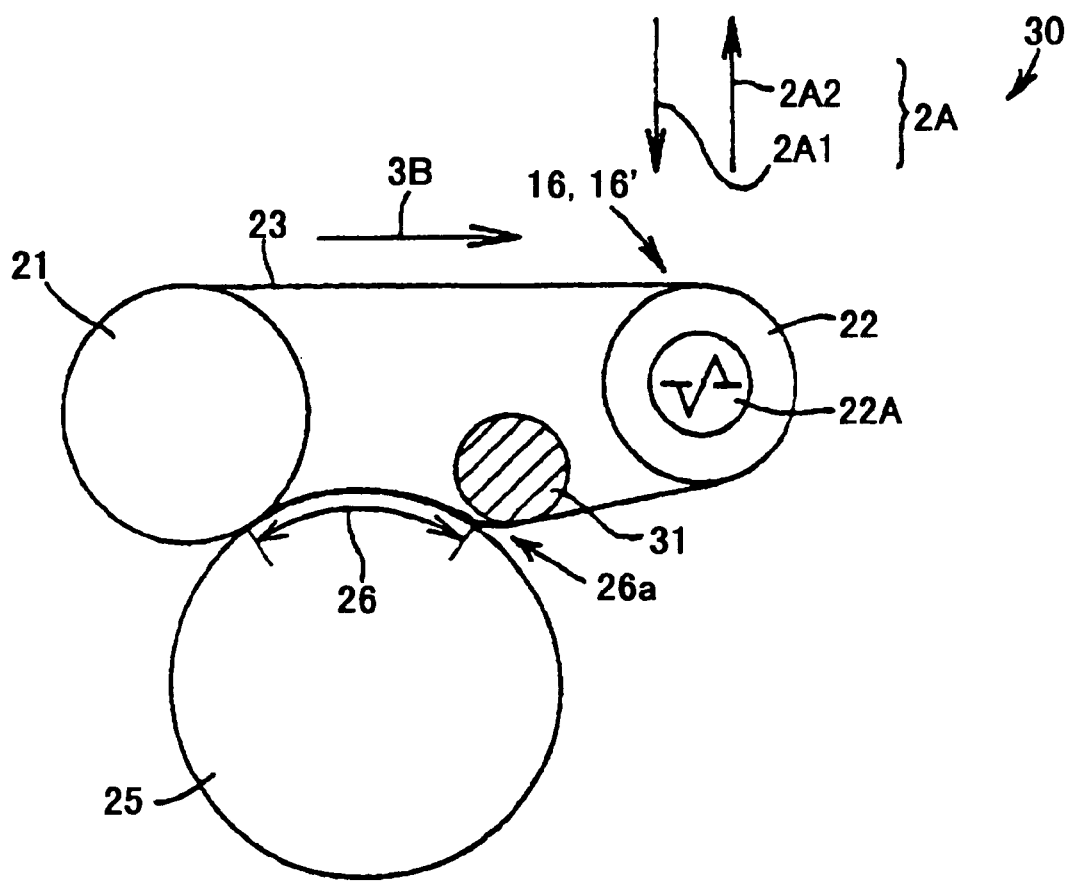
FIG. 18 is a side elevational view showing the main part of the belt fixing apparatus of the fourth embodiment.

The fourth embodiment according to the present invention is shown in FIG. 18. Belt fixing apparatus 30 of the fourth embodiment differs from the belt fixing apparatus 20 of the third embodiment, only in that a guide member 31 for contacting an inner circumferential surface of the fixing belt 23 is provided between the heating roller 22 and the pressure roller 25, in parallel with the fixing roller 21 and the pressure roller 25.

For example, the guide member 31 may be composed of a cylindrical roller member made of metal.

In the fourth embodiment, the heating roller 22 is provided as the driven roller 2 for preventing the belt shift. When the belt shift preventing function begins, the recording paper (not shown in FIG. 18) having the non-fixed image formed thereon is conveyed to a fixing nip portion 26 while the one side of the heating roller 22 is in a displaced state (in the third embodiment, the heating roller 22 as the driven roller 2 is displaced in the twisting downward 2A1).

In such a state as mentioned above, the fixing nip inlet portion 26a of the fixing nip portion 26 composed of the fixing belt 23 and the pressure roller 25 may not be parallel with the shaft of the fixing roller 21. The recording paper may therefore be conveyed into the fixing nip portion 26 in an inclined state. Therefore, there is a possibility that the wrinkles and the paper jam may easily occur.

In order to prevent such jamming, a guide member 31 is arranged to contact the inner surface circumferential surface of the fixing belt 23 and to be substantially parallel with the fixing roller 21 and the pressure roller 25. Guide member 31 is brought into contact with the inner circumferential surface of the fixing belt 23 at a place between the heating roller 22 and the pressure roller 25. Accordingly, the tip end of the recording paper advances in parallel into the fixing nip through the inlet portion 26a.

Fifth Embodiment

Figure 19:
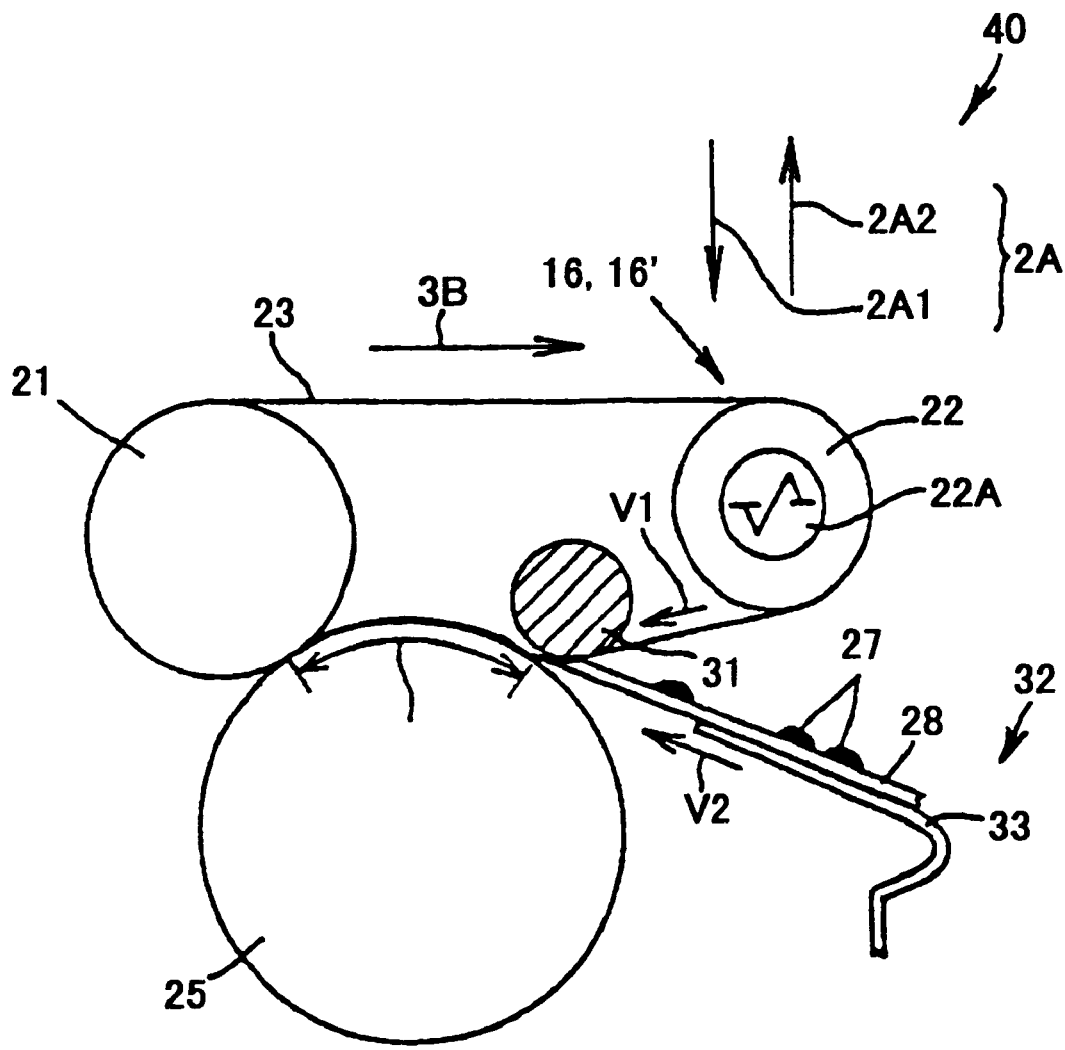
FIG. 19 is side elevational view showing the main part of the belt fixing apparatus of the fifth embodiment.

The fifth embodiment according to the present invention is illustrated in FIG. 19. The fifth embodiment differs from the forth embodiment only in the construction of a belt fixing apparatus 40 which includes a further condition on the conveying speeds associated with the rotational speeds used in operation.

Namely, as shown in FIG. 19, the fixing belt conveying speed V1 is not greater than the conveying apparatus conveying speed V2 of the conveying apparatus 32 for conveying the recording paper 28 having the layer of non-fixed toner 27 formed thereon to the fixing nip portion 26.

Since the fixing belt conveying speed V1 is set to the value equal to or smaller than the conveying apparatus conveying speed V2, even though the recording paper 28 advances into the fixing nip portion 26 in the state of being inclined, no force of stretching the recording paper 28 appears. As a result, defects such as skew, wrinkles, and the like do not appear at all.

As mentioned above, the specified embodiments of the present invention have been described. However, the structure according to the present invention is not limited to any one of the aforementioned first through fifth embodiments. Namely, it is apparent to the one skilled in the art that structure can be suitably formed by the combination thereof, and the various sorts of embodiments or embodiments in accordance with the necessity or usage within the scope of the present invention.

Obviously, numerous modifications or variations of the present invention are possible in light of the above teachings. It is therefore to be understood that within the scope of the appended claims, the invention may be practiced otherwise than as specifically described herein.

Having now fully described the invention, it will be apparent to one of ordinary skill in the art that many changes and modifications can be made thereto without departing from the spirit and scope of the invention as set forth herein. This application is based on Japanese patent Applications JPAP09-281865/1997 filed on Oct. 15, 1997, the entire contents of which are hereby incorporated by reference.

What is claimed as new and desired to be secured by Letters Patent of the United States:

1. A belt driving apparatus comprising:

an endless belt wrapped around and stretched between at least a driving and a driven roller, said driven roller supported by driven roller shaft;

a belt shift detecting member configured to detect a shift of said endless belt, said belt shift detecting member rotatably supported by at least one end of said driven roller shaft, independently from said driven roller;

a supporting device supporting said at least one end of said driven roller shaft and being moveable in a direction perpendicular to a longitudinal axis of said driven roller shaft; and a conversion device configured to convert a displacement of said at least one end of said driven roller shaft into a displacement in a predetermined direction perpendicular to said driven roller shaft, when said endless belt is brought into contact with said belt shift detecting member so as to transmit a rotation torque to said belt shift detecting member, wherein said conversion device comprises:

a secured member mounted on a main body side of said apparatus, said secured member arranged to contact a portion of said belt shift detecting member when said belt shift detecting member rotates to a predetermined angle caused said rotation torque; and a cam configured to convert a rotation of said belt shift detecting member to a linear movement.

2. The belt driving apparatus according to claim 1, further comprising:

a first stopping member mounted on a main body side of said apparatus; and a second stopping member mounted on said belt shift detecting member, said second stopping member configured to communicate with said first stopping member, and thereby stop a rotation of said belt shift detecting member when said belt shift detecting member rotates to a predetermined angle, said second stopping member being mounted on said belt shift detecting member.

3. The belt driving apparatus according to claim 1, wherein said supporting device further comprises:

a shaft-end-portion supporting member configured to support said at least one end of said driven roller shaft;

a belt tensioner member arranged so as to maintain a tension in said endless belt between said driving roller and said driven roller, and maintaining said endless belt to a predetermined position; and a guiding member configured to guide said shaft-end-portion supporting member in said predetermined direction and in a direction that is at least substantially parallel to a direction along which said belt is maintained in tension.

4. The belt driving apparatus according to claim 3, wherein said guiding member has an approximately oval-shaped hole, and wherein said approximately oval-shaped hole is arranged such that said approximately oval-shaped hole extends approximately in said direction along which said belt is maintained in tension and in said predetermined direction in which said shaft-end-portion supporting member is guided.

5. The belt driving apparatus according to claim 1, wherein said shaft-end-portion supporting member is a rolling-element bearing.

6. The belt driving apparatus according to claim 1,
   wherein said endless belt is a fixing belt configured to convey a recording paper to a toner fixing position at which a toner is fixed on the recording paper;
   wherein said driven roller includes a heat source for heating said fixing belt;
   wherein said driving roller is a fixing roller, and
   wherein said belt fixing apparatus further comprises a pressure roller for forming a fixing nip portion between said pressure roller and said fixing roller, said pressure roller configured to be in pressure contact with a portion of said fixing belt positioned between said fixing roller and said pressure roller.

7. The belt driving apparatus according to claim 6, further comprising a guide member arranged to contact an inner circumferential surface of said fixing belt, said guide member provided between said heating roller and said pressure roller, said guide member arranged such that a longitudinal axis of said guide member is substantially parallel with a longitudinal axis of said fixing roller and said pressure roller.

8. The belt driving apparatus according to claim 6, wherein a fixing belt conveying speed of said fixing belt is not greater than a conveying speed of a conveying device for conveying the recording paper to said fixing nip portion.

9. The belt driving apparatus according to claim 3, wherein said direction along which said belt is maintained in tension is substantially parallel to a substantially planar portion of said belt between said driving roller and said driven roller, and wherein said predetermined direction is substantially perpendicular to said direction along which said belt is maintained in tension.

10. A belt driving apparatus comprising:

a driving roller means;

a driven roller means supported by a shaft;

a belt means having an endless-belt configuration wrapped around at least said driving roller means and said driven roller means;

belt shift detecting means for detecting a shift of said belt means, said belt shift detecting means being rotatably supported on at least one of end portion of the shaft supporting said driven roller means and supported independently from said driven roller means;

means for moveably supporting the at least one end portion of said shaft, such that the at least one end portion of said shaft is moveable in a direction substantially perpendicular to a longitudinal axis of said shaft; and means for converting rotation of the end portion of said shaft to a displacement in a predetermined direction perpendicular to the longitudinal direction of said shaft, when said belt means is brought into contact with said belt shift detecting means and thereby transmits a rotation torque to said belt shift detecting means, said means for converting a displacement comprising:

a cam means for converting the rotational motion of said belt shift detecting means to a linear motion;

a secured member provided at a side of a main body of said apparatus, arranged so as contact a portion of said cam means such that when the rotation torque causes said belt shift detecting means to rotate to a predetermined angle, said cam means moves said belt shift detection means in a linear motion.

11. The belt driving apparatus according to claim 10, wherein said belt driving apparatus further comprises:

stopping means for stopping the rotation of said belt shift detection means.

12. The belt driving apparatus according to claim 10, wherein said stopping means comprises:

a first stopping member; and a first stopping means for stopping the rotation of said belt shift detecting means by engaging with said first stopping member when said belt shift detecting means rotates to a predetermined angle.

13. The belt driving apparatus according to claim 10, wherein said means for moveably supporting further comprises:

means for maintaining a tension in said belt means;

means for maintaining said driven roller means in a predetermined position; and means for guiding the end portion of said shaft in the predetermined direction and for guiding the end portion of the shaft in a direction substantially perpendicular and substantially co-planar with said predetermined direction.

14. The belt driving apparatus according to claim 13, wherein said means for guiding comprises an approximately slot-shaped aperture extending in the predetermined direction and in the direction substantially perpendicular and substantially co-planar with said predetermined direction.

15. The belt driving apparatus according to claim 10, wherein said means for moveably supporting comprises a ball bearing means.

16. A belt driving apparatus according to claim 10, wherein said driven roller means comprises means for heating said belt means and a recording paper carried by said belt means;

wherein said driving roller means comprises fixing roller means; and wherein said belt driving apparatus further comprises means for forming a fixing nip portion by providing pressure against a portion of said belt means which is between said means for forming a nip portion and said fixing roller means.

17. The belt fixing apparatus according to claim 16, further comprising belt guide means for contacting an inner circumferential surface of said belt means, said belt guide means arranged at a side of the inner circumferential surface of said belt means between said means for heating said belt means and said pressure roller means and parallel to said fixing roller means and said pressure roller means.

18. The belt fixing apparatus according to claim 16, wherein a fixing means conveying speed of said fixing means is not greater than a conveying speed of means for conveying the recording paper to said fixing nip portion.

19. The belt fixing apparatus according to claim 13, wherein the direction substantially perpendicular and substantially co-planar with said predetermined direction is substantially parallel to a substantially planar portion of said belt between said driving roller and said driven roller.

20. A method for preventing a belt shift comprising the steps of:

tensioning a belt having an endless-belt configuration between a driving roller and a driven roller;

detecting a shift of said belt with a belt shift detecting member which is rotatably supported on at least one end portion of a shaft of said driven roller;

supporting the end portion of said shaft of said driven roller moveably in a direction perpendicular to the end portion of said shaft; and converting a rotation of said belt shift detecting member to a linear movement thereof, in a direction perpendicular to a longitudinal direction of said shaft.

21. The belt fixing apparatus according to claim 20, wherein said predetermined direction is substantially perpendicular to a substantially planar portion of said belt between said driving roller and said driven roller.

* * * * *